United States Patent
Lu et al.

(10) Patent No.: US 12,504,611 B2
(45) Date of Patent: Dec. 23, 2025

(54) COMPOUND LENS

(71) Applicant: OmniVision Technologies, Inc., Santa Clara, CA (US)

(72) Inventors: I-Lung Lu, New Taipei (TW); Kuang-Ju Wang, Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 416 days.

(21) Appl. No.: 18/098,652

(22) Filed: Jan. 18, 2023

(65) Prior Publication Data

US 2024/0241357 A1    Jul. 18, 2024

(51) Int. Cl.
G02B 15/177    (2006.01)
G02B 13/18     (2006.01)

(52) U.S. Cl.
CPC ........... *G02B 15/177* (2013.01); *G02B 13/18* (2013.01)

(58) Field of Classification Search
CPC .... G02B 15/177; G02B 13/18; G02B 13/004; G02B 13/006; G02B 13/0015; G02B 13/06; G02B 9/34; G02B 23/243; A61B 1/00163; A61B 1/00174
See application file for complete search history.

(56) References Cited

U.S. PATENT DOCUMENTS

| | | | |
|---|---|---|---|
| 7,796,349 B2 * | 9/2010 | Deng | G02B 13/18 359/756 |
| 9,778,443 B2 | 10/2017 | Cheng et al. | |
| 9,798,115 B1 | 10/2017 | Yin et al. | |
| 2007/0242370 A1 * | 10/2007 | Fukuta | G02B 9/34 359/773 |
| 2010/0091386 A1 * | 4/2010 | Deng | G02B 13/18 359/773 |
| 2011/0080513 A1 * | 4/2011 | Hsu | G02B 13/00 348/E5.025 |
| 2013/0094102 A1 * | 4/2013 | Baba | G02B 13/0035 359/784 |
| 2013/0141802 A1 * | 6/2013 | Yang | G02B 13/004 359/717 |
| 2014/0334016 A1 | 11/2014 | Yin et al. | |
| 2015/0077622 A1 * | 3/2015 | Ueno | G02B 13/0055 348/360 |
| 2017/0199348 A1 * | 7/2017 | Yin | G02B 27/0025 |
| 2017/0307856 A1 | 10/2017 | Yin et al. | |
| 2023/0288665 A1 * | 9/2023 | Kobayashi | G02B 13/00 |

* cited by examiner

*Primary Examiner* — George G. King
*Assistant Examiner* — Anna Smith
(74) *Attorney, Agent, or Firm* — Cozen O'Connor (57) ABSTRACT

A compound lens includes four coaxially aligned lenses: (i) first lens and, in order of increasing distance therefrom, and on a same side thereof, (ii) a second lens, an inter-lens substrate, a third lens, and a fourth lens. The first lens and the third lens are negative lenses. The second lens and the fourth lens are positive lenses.

12 Claims, 8 Drawing Sheets

| surface/plane | radius of curvature, mm | thickness, mm | refractive index | Abbe number | semi-aperture, mm | conic | 4th-order term | 6th-order term | 8th-order term | 10th-order term | 12th-order term | 14th-order term | 16th-order term |
|---|---|---|---|---|---|---|---|---|---|---|---|---|---|
| surface 551 | Infinite | 0.2500 | 1.52 | 62.6 | 0.8811 | | | | | | | | |
| surface 511 | Infinite | 0.0300 | 1.51 | 61.2 | 0.7223 | | | | | | | | |
| surface 512 | 0.2979 | 0.3720 | | | 0.4940 | -0.9641 | -2.1980 | 5.0093E+00 | 5.1442E+01 | -1.3908E+03 | 1.1028E+04 | -3.8039E+04 | 4.9126E+04 |
| surface 521 | 0.3394 | 0.2547 | 1.62 | 26.2 | 0.3782 | -0.3020 | -4.3248 | 1.1439E+02 | -3.0632E+03 | 4.3111E+04 | -3.5114E+05 | 1.5334E+06 | -2.8565E+06 |
| surface 561 | Infinite | 0.2617 | 1.52 | 62.6 | 0.3561 | | | | | | | | |
| surface 531, stop 565 | Infinite | 0.0300 | 1.51 | 61.2 | 0.1564 | | | | | | | | |
| surface 532 | 1.1213 | 0.0439 | | | 0.1790 | 8.6129 | 8.8288 | -3.9912E+02 | 1.8222E+04 | -2.8140E+05 | | | |
| surface 571 | Infinite | 0.1500 | 1.52 | 62.6 | 0.2141 | | | | | | | | |
| surface 541 | Infinite | 0.1682 | 1.62 | 26.2 | 0.3235 | | | | | | | | |
| surface 542 | -0.4565 | 0.0142 | | | 0.3440 | -11.394 | -7.9072 | 3.1555E+01 | 1.7031E+03 | -4.7756E+03 | 5.4524E+04 | -3.0185E+05 | 6.4913E+06 |
| surface 591 | Infinite | 0.1500 | 1.52 | 62.6 | 0.4129 | | | | | | | | |
| air gap | Infinite | 0.4164 | | | 0.4555 | | | | | | | | |
| image plane 599 | Infinite | 0.0327 | | | 0.6659 | | | | | | | | |

COMPOUND LENS

BACKGROUND

Medical endoscopy, machine vision, eye/face tracking, and other applications require a compact camera that is able to capture a quality image with a wide field-of-view, and is manufacturable via a low-cost process compatible with high-volume manufacturing.

SUMMARY OF THE EMBODIMENTS

Embodiments disclosed herein include lenses that enable such a camera. A compound lens includes four coaxially aligned lenses: (i) first lens and, in order of increasing distance therefrom, and on a same side thereof, (ii) a second lens, an inter-lens substrate, a third lens, and a fourth lens. The first lens and the third lens are negative lenses. The second lens and the fourth lens are positive lenses.

DETAILED DESCRIPTION OF THE EMBODIMENTS

Figure 1:
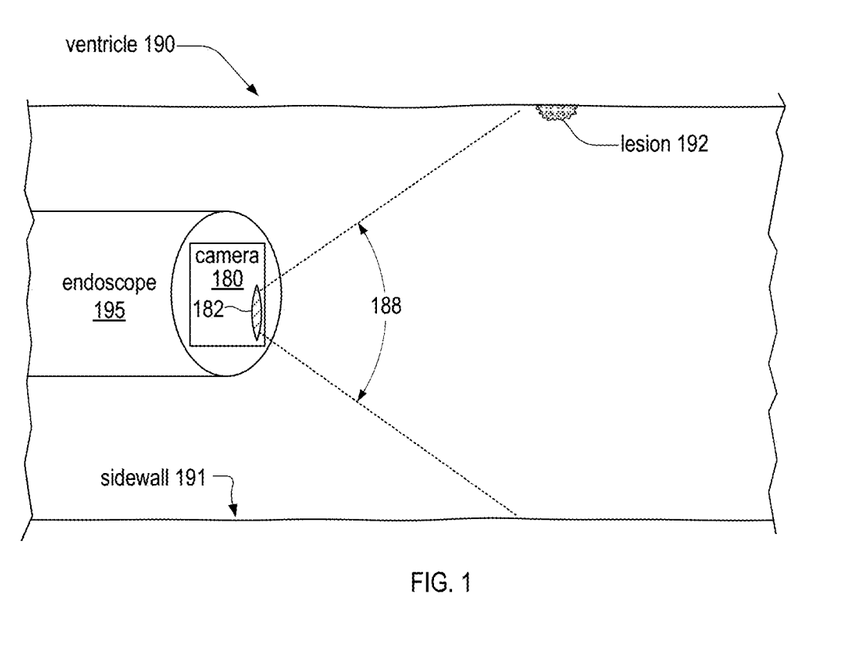
FIG. 1 is a cross-sectional view of a ventricle that includes a lesion imaged by an endoscope camera that includes a compound lens, in an embodiment.

FIG. 1 is a cross-sectional view of an endoscope 195 inside a ventricle 190 that includes a lesion 192. Lesion 192 is on a ventricle sidewall 191. Ventricle 190 may be, for example, a portion of an esophagus or an intestine. Endoscope 195 includes a camera 180, which images lesion 192. Camera 180 includes a lens 182, which in part determines a field of view 188 of camera 180. Without departing from the scope hereof, camera 180 may be part of a device other than an endoscope, such as a security camera, mobile device, or other consumer electronics product.

Figure 2:
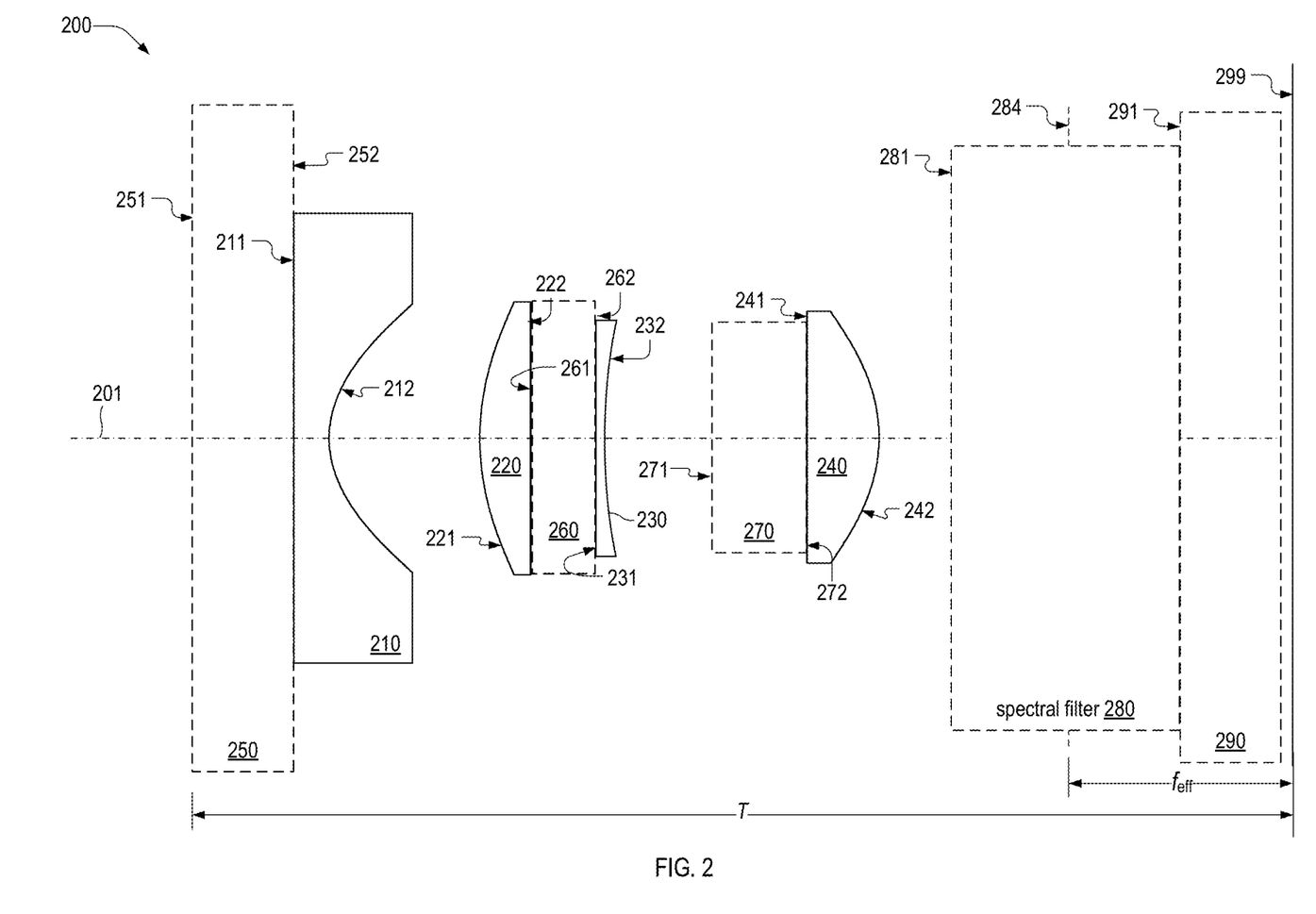
FIG. 2 is a schematic cross-sectional view of a compound lens, which is an embodiment of the compound lens of FIG. 1.

FIG. 2 is a cross-sectional view of a compound lens 200, which is an example of lens 182 of camera 180. Compound lens 200 includes a lens 210 and, in order of increasing distance therefrom, and on a same side thereof, a lens 220, a substrate 260, a lens 230, and a lens 240. Lens 210 and lens 230 are negative lenses. Lens 220 and lens 240 are positive lenses. Lenses 210-240 are coaxial about a common optical axis 201. Lenses 210-240 have respective object-side surfaces 211, 221, 231, and 241, and respective image-side surfaces 212, 222, 232, and 242. At least one of surfaces 212, 221, 232, and 242 may be non-planar and aspheric. At optical axis 201, at least one of surfaces 212 and 232 may be concave, and at least one of surfaces 221 and 242 may be convex.

Compound lens 200 may also include at least one of a substrate 250, a substrate 270, a spectral filter 280, and a cover glass 290. Substrates 250, 260, 270 have respective object-side surfaces 251, 261, and 271, and respective image-side surfaces 252, 262, and 272. At least one of surfaces 211, 222, 231, 241, 251, 261, 262, 271, and 272 may be planar. Spectral filter 280 and cover glass 290 have respective object-side surfaces 281 and 291. An aperture stop of lens 200 may be at either surface 231 or 271.

In embodiments, at least one of: lens 210 is on substrate 250, lens 220 is on substrate 260, lens 230 is on substrate 260, and lens 240 is on substrate 270. Stated in terms of surfaces, in embodiments, at least one of: object-side surface 211 is on image-side surface 252, image-side surface 222 is on object-side surface 261, object-side surface 231 is on image-side surface 262, and object-side surface 241 is on image-side surface 272.

Compound lens 200 has an effective focal length $f_{eff}$ between a principal plane 284 and an image plane 299, and a total track length T between object-side surface 251 and image plane 299. In embodiments, the ratio $T/f_{eff}$ satisfies $3 < T/f_{eff} < 13$, which constrains transverse and longitudinal dimensions of compound lens 200. In embodiments, $T/f_{eff}$ satisfies the aforementioned lower and upper bounds at wavelengths between 420 nm and 860 nm.

Lenses 210, 220, 230, and 240 have respective focal lengths $f_1$, $f_2$, $f_3$, and $f_4$. In embodiments, the ratio $R_1 = (f_1 + f_3) f_{eff} / (f_1 f_3)$ is greater than $-2.5$ and less than $-0.3$. A benefit of limiting the ratio $R_1$ to the aforementioned range is to balance distortion of compound lens 200. In embodiments, the ratio $R_2 = (f_2 + f_4) f_{eff} / (f_2 f_4)$ is greater than 0.4 and less than 3. A benefit of limiting the ratio $R_2$ to the aforementioned range is to balance aberrations and improve the modulation transfer function of compound lens 200. In embodiments, values of ratio $R_1$ and ratio $R_2$ are within their respective ranges at wavelengths between 420 nm and 860 nm.

Lenses 210 and 240 have respective Abbe numbers $V_{210}$ and $V_{240}$, which are computed at the blue, green, and red Fraunhofer F-, d- and C-spectral lines: $\lambda_F = 486.1$ nm, $\lambda_d = 587.6$ nm, and $\lambda_C = 656.3$ nm, respectively. In embodiments, $V_{210} \geq 37$ and $V_{240} \geq 26$, which results in reduced chromatic aberrations such as lateral color and axial color.

Figure 3:
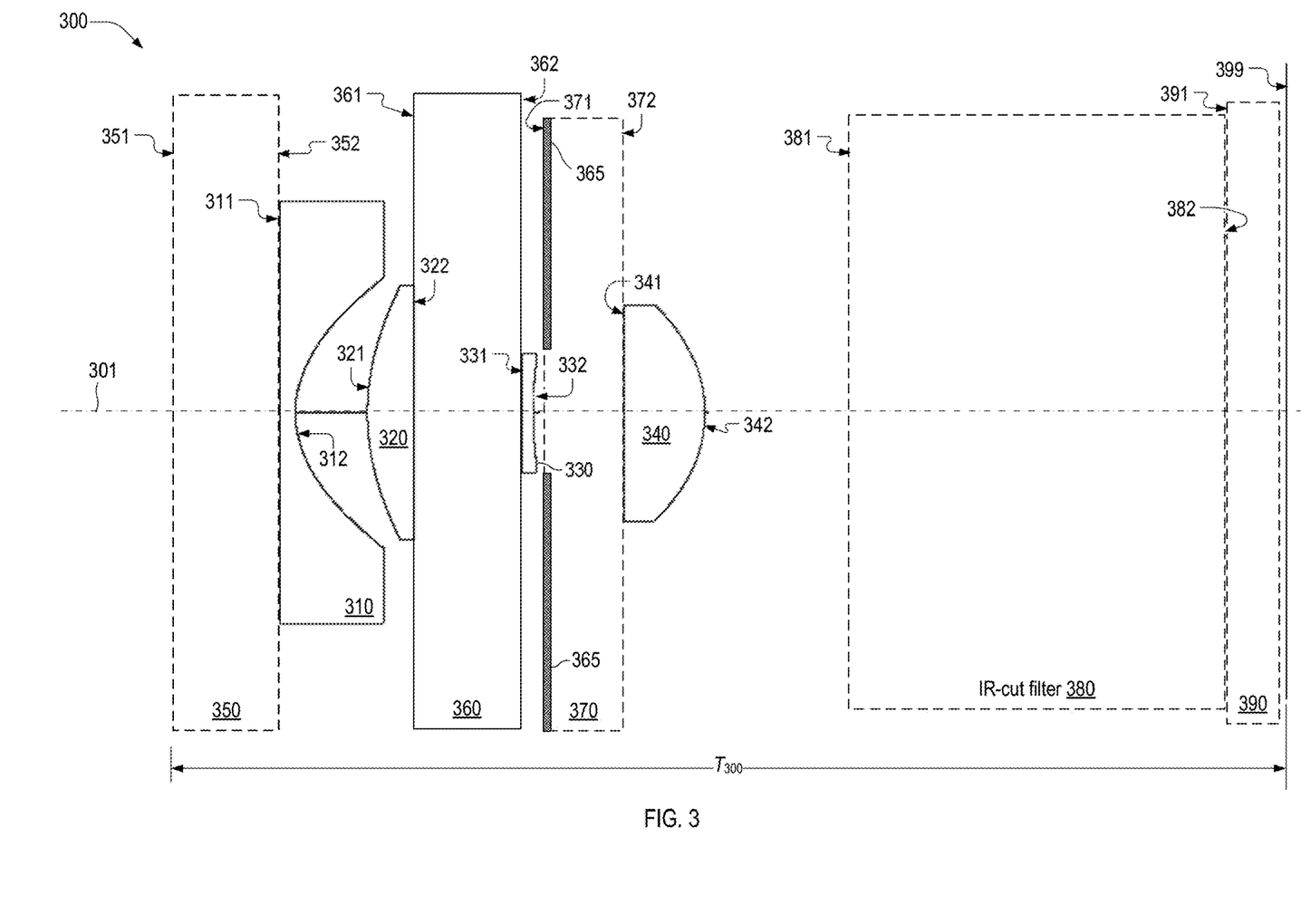
FIG. 3 is a cross-sectional view of an embodiment of the compound lens of FIG. 2 for visible-light imaging.

FIG. 3 is a cross-sectional view of a compound lens 300, which is an embodiment of compound lens 200 for imaging at visible wavelengths. Compound lens 300 includes substrate 360, lenses 310, 320, 330, and 340, and may also include at least one of substrate 350, substrate 370, an aperture stop 365, an IR-cut filter 380, and a cover glass 390. Lenses 310-340 are coaxial about an optical axis 301. When compound lens 300 includes substrate 370, aperture stop 365 is at object-side surface 371, and may be an opaque coating on surface 371.

Lenses 310-340 have respective object-side surfaces 311, 321, 331, and 341, and respective image-side surfaces 312, 322, 332, and 342. Substrates 350, 360, 370, IR-cut filter 380, and cover glass 390 have respective object-side surfaces 351, 361, 371, 381, and 391, and respective image-side surfaces 352, 362, 372, 382, and 392.

Herein, an element of FIG. 3 or subsequent figures denoted by a reference number with a specific tens-place value and ones-place value is an example of the element of FIG. 2 having the same tens-place value and ones-place value. For example, lens 310, surface 311, and surface 312 are respective examples of lens 210, surface 211, and surface 212.

Figure 4:
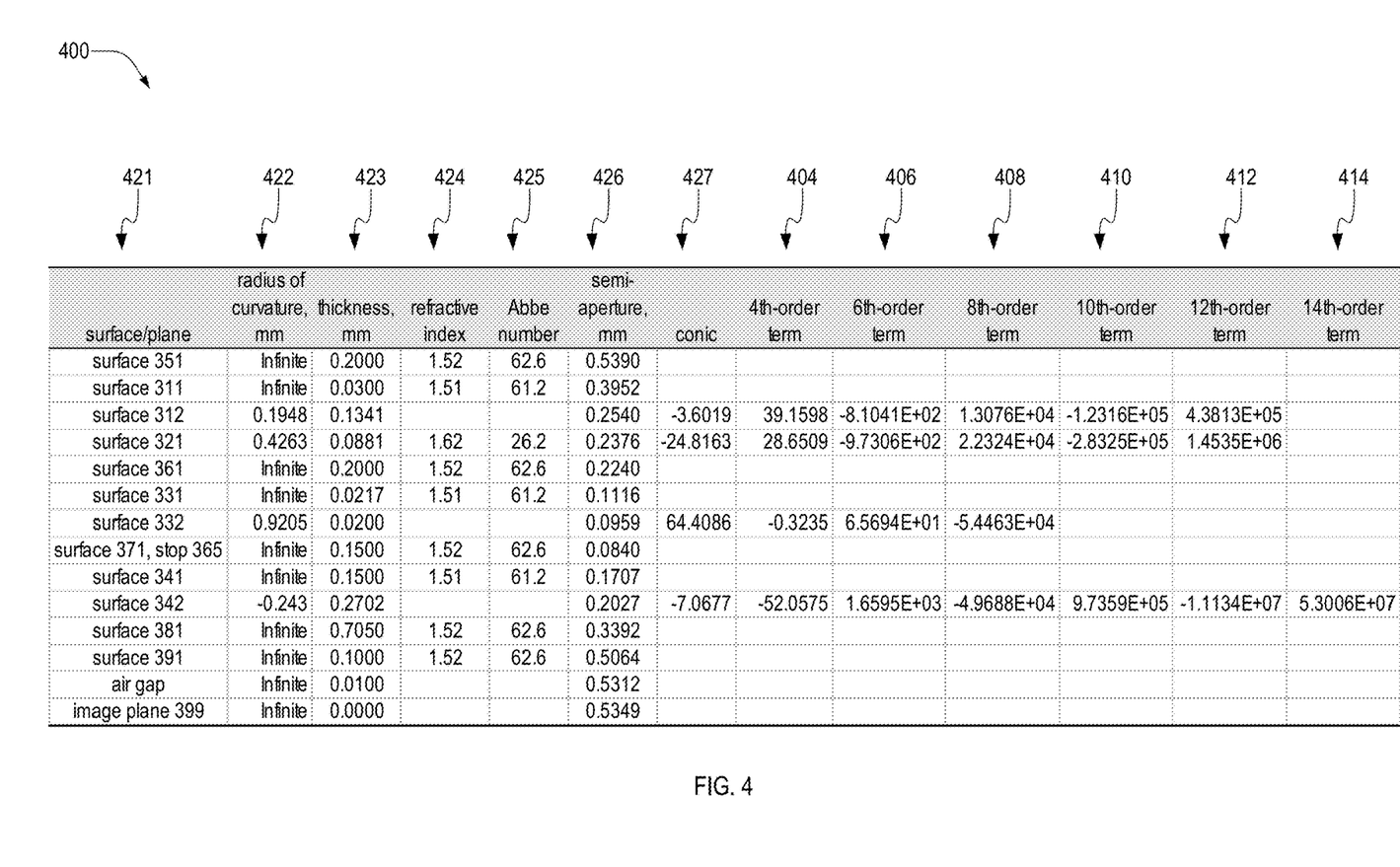
FIG. 4 shows a table of example parameters of the compound lens of FIG. 3.

FIG. 4 is a table 400 of example parameters of surfaces and substrates of compound lens 300. Table 400 includes columns 404, 406, 408, 410, 412, 414 and 421-427. Column 421 denotes surfaces of compound lens 300, and also aperture stop 365. Column 423 includes thickness values between adjacent surfaces of compound lens 300 on optical axis 301. For example, the axial distance between surfaces 311 and 312 is 0.030 millimeters, which is the axial thickness of lens 310. Column 426 indicates the minimum diameter of each surface sufficient for a ray incident on surface 311 that passes through aperture stop 365 to also pass through that surface.

Non-planar surfaces of table 400 are defined by surface sag $z_{sag}$, shown in Eqn. 1.

$$z_{sag} = \frac{R^{-1}r^2}{1 + \sqrt{1-(1+k)R^{-2}r^2}} + \sum_{i=2}^{N} \alpha_{2i}r^{2i} \quad (1)$$

In Eqn. 1, $z_{sag}$ is a function of radial coordinate r, where directions z and r are, respectively, parallel to and perpendicular to, optical axis 301. Index i is a positive integer and, in the example of FIG. 4, N=7. In Eqn. 1, the parameter R is the surface radius of curvature, listed in column 422 of table 400. Parameter k denotes the conic constant, shown in column 427. Columns 404, 406, 408, 410, 412, and 414 contain values of aspheric coefficients $\alpha_4$, $\alpha_6$, $\alpha_8$, $\alpha_{10}$, $\alpha_{12}$, and $\alpha_{14}$, respectively. The units of quantities in table 400 are consistent with $z_{sag}$ in Eqn. 1 being expressed in millimeters.

Columns 424 and 425 list values of material refractive index, at free-space wavelength $\lambda_d$=587.6 nm, and Abbe number, respectively. The refractive index and Abbe number corresponding to a surface characterize the material between the surface and the surface in the row beneath. For example, the refractive index and Abbe number associated with surface 311 are 1.51 and 61.2, which are the refractive index and Abbe number of lens 310, respectively.

Compound lens 300 has an effective focal length $f_{300}$=0.43 mm (at $\lambda_0$=570 nm), a field of view of 125 degrees, and an f-number equal to 4. The total track length of compound lens 300 is $T_{300}$=2.08 mm between surface 311 and an image plane 399. The ratio of total track length to effective focal length is $T_{300}/f_{300}$=1.65.

Lenses 310-340 have respective focal lengths $f_1$, $f_2$, $f_3$, and $f_4$, each of which may be approximated by the lensmaker's equation using values of radii of curvature, axial thickness, and refractive index from Table 4. The computed focal lengths are $f_1$=−0.38 mm, $f_2$=0.69 mm, $f_3$=−1.86 mm, and $f_4$=0.48 mm, such that $R_1$=−1.55 and $R_2$=1.74. Wavelength dependence of refractive indices and effective focal length between $\lambda_d$=587.6 nm and $\lambda_0$=570 nm are sufficiently small such that the aforementioned focal length values and ratios apply at both $\lambda_d$ and $\lambda_0$.

Figure 5:
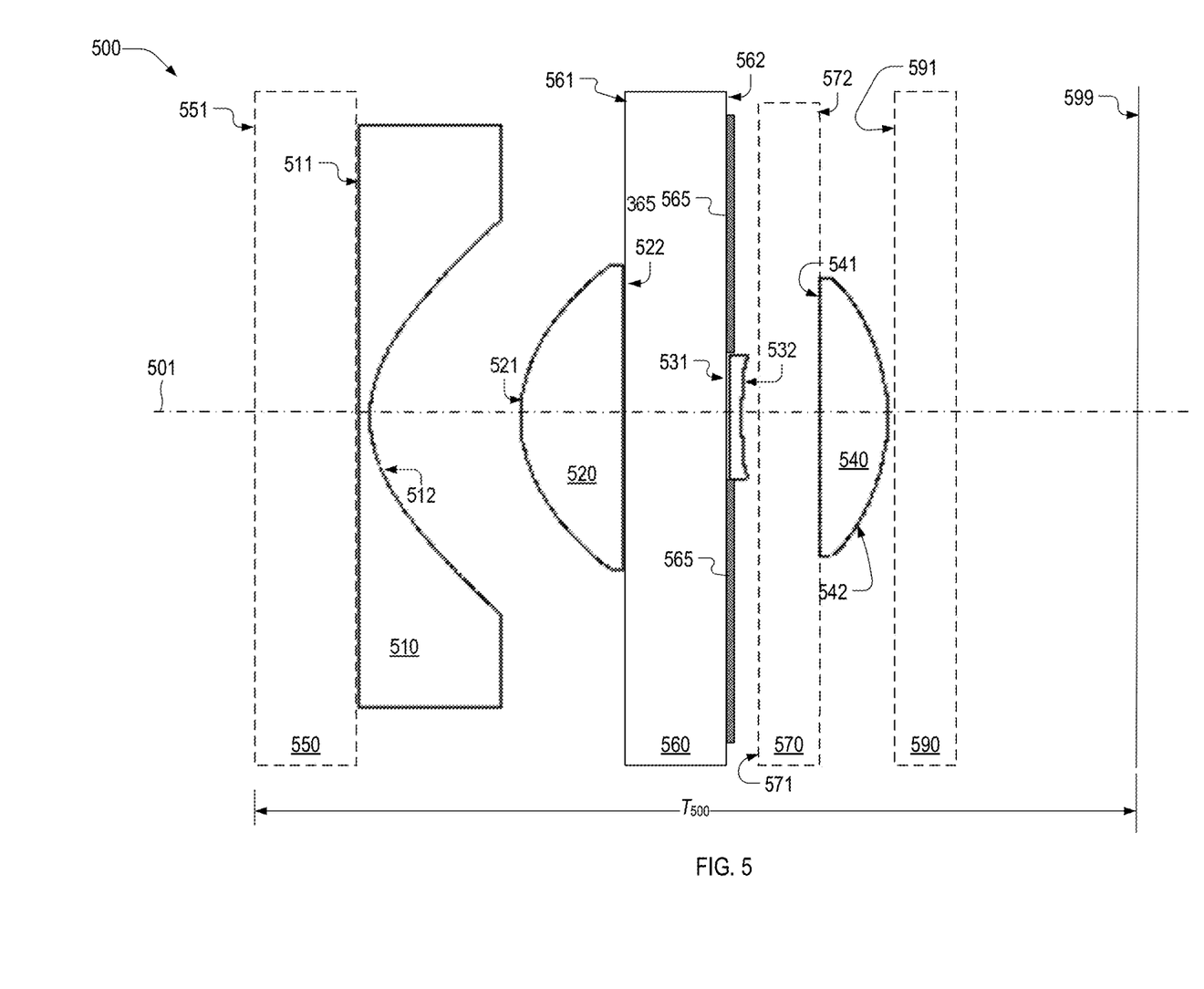
FIG. 5 is a cross-sectional view of an embodiment of the compound lens of FIG. 2 for infrared imaging.

FIG. 5 is a cross-sectional view of a compound lens 500, which is an embodiment of compound lens 200 for imaging at near-infrared wavelengths. Compound lens 500 includes substrate 560, lenses 510, 520, 530, and 540, and may also include at least one of substrate 550, substrate 570, an aperture stop 565, and a cover glass 590. Lenses 510-540 are coaxial about an optical axis 501. Aperture stop 565 is at image-side surface 562, and may be an opaque coating on surface 562.

Lenses 510-540 have respective object-side surfaces 511, 521, 531, and 541, and respective image-side surfaces 512, 522, 532, and 542. Substrates 550, 560, 570, and cover glass 590 have respective object-side surfaces 551, 561, 571, and 591, and respective image-side surfaces 552, 562, 572, and 592.

Figure 6:
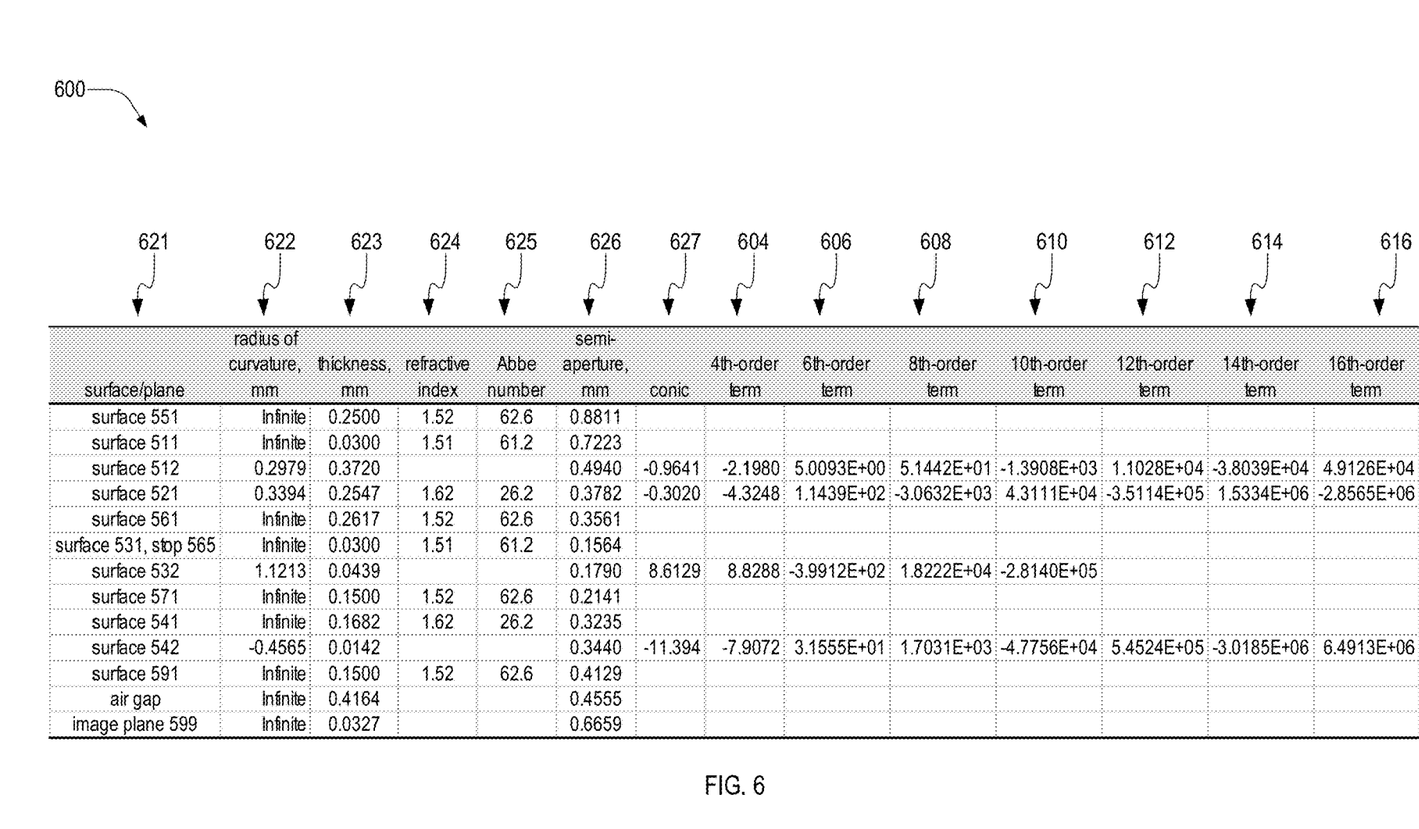
FIG. 6 shows a table of example parameters of the compound lens of FIG. 5.

FIG. 6 is a table 600 of example parameters of surfaces and substrates of compound lens 500. Table 600 includes columns 604, 606, 608, 610, 612, 614, 616, and 621-627, which follow the same convention of Table 400 described above. Column 621 denotes surfaces of compound lens 500, and also aperture stop 565. Columns 624 and 625 are analogous to columns 424 and 425 of Table 400, and therefore include values of material refractive index, at free-space wavelength $\lambda_d$=587.6 nm, and Abbe number, respectively.

Compound lens 500 has an effective focal length $f_{300}$=0.49 mm (at $\lambda_0$=850 nm), a field of view of 103 degrees, and an f-number equal to 1.95. The total track length of compound lens 500 is $T_{500}$=2.17 mm between surface 511 and an image plane 599. The ratio of total track length to effective focal length is $T_{500}/f_{500}$=4.43.

Lenses 510-540 have respective focal lengths $f_1$, $f_2$, $f_3$, and $f_4$, each of which may be approximated by the lensmaker's equation using values of radii of curvature, axial thickness, and refractive index from Table 6. The computed focal lengths are $f_1$=−0.58 mm, $f_2$=0.55 mm, $f_3$=−2.20 mm, and $f_4$=0.74 mm, such that $R_1$=−1.06 and $R_2$=1.56. Wavelength dependence of refractive indices and effective focal length between $\lambda_d$=587.6 nm and $\lambda_0$=850 nm are sufficiently small such that the aforementioned focal length values and ratios apply at both $\lambda_d$ and $\lambda_0$.

Figure 7:
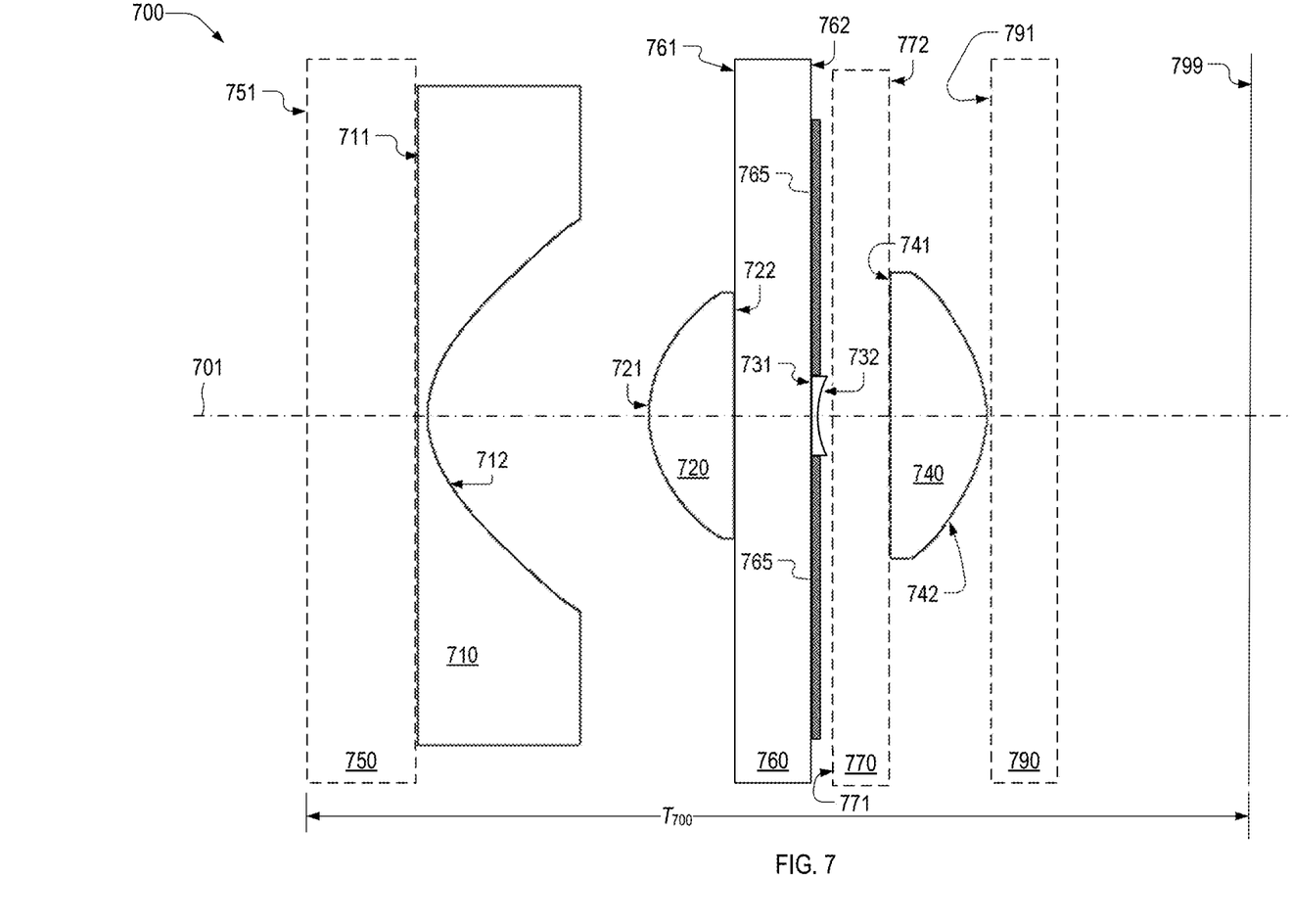
FIG. 7 is a cross-sectional view of an embodiment of the compound lens of FIG. 2 for infrared imaging.

FIG. 7 is a cross-sectional view of a compound lens 700, which is an embodiment of compound lens 200 for imaging at near-infrared wavelengths. Compound lens 700 includes substrate 760, lenses 710, 720, 730, and 740, and may also include at least one of substrate 750, substrate 770, an aperture stop 765, and a cover glass 790. Lenses 710-740 are coaxial about an optical axis 701. Aperture stop 765 is at image-side surface 762, and may be an opaque coating on surface 762.

Lenses 710-740 have respective object-side surfaces 711, 721, 731, and 741, and respective image-side surfaces 712, 722, 732, and 742. Substrates 750, 760, 770, and cover glass 790 have respective object-side surfaces 751, 761, 771, and 791, and respective image-side surfaces 752, 762, 772, and 792.

Figure 8:
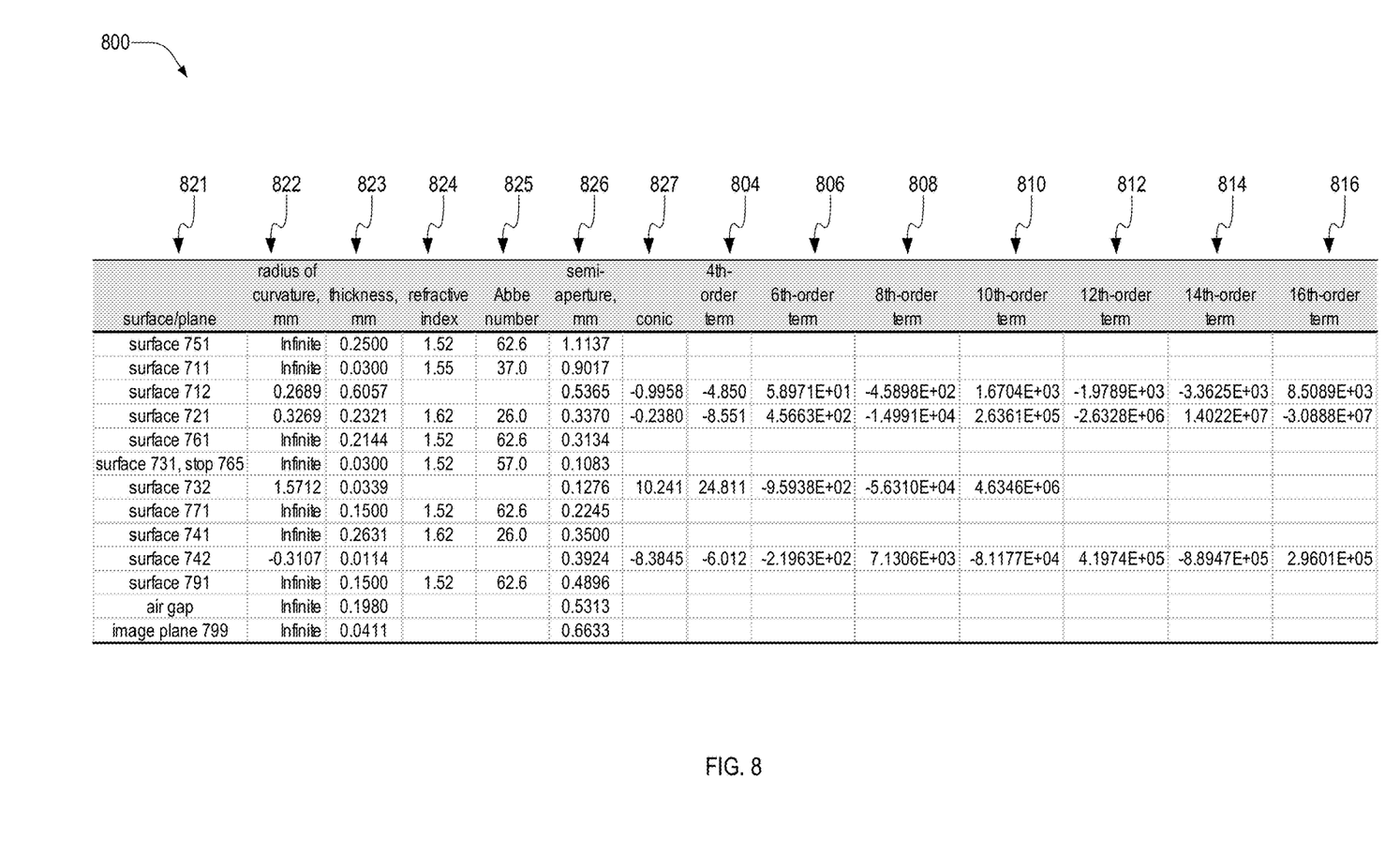
FIG. 8 shows a table of example parameters of the compound lens of FIG. 7.

FIG. 8 is a table 800 of example parameters of surfaces and substrates of compound lens 700. Table 800 includes columns 804, 806, 808, 810, 812, 814, 816, and 821-827, which follow the same convention of Table 400 described above. Column 821 denotes surfaces of compound lens 700, and also aperture stop 765. Columns 824 and 825 are analogous to columns 424 and 425 of Table 400, and therefore include values of material refractive index, at free-space wavelength $\lambda_d$=587.6 nm, and Abbe number, respectively.

Compound lens 700 has an effective focal length $f_{300}$=0.27 mm (at $\lambda_0$=850 nm), a field of view of 103 degrees, and an f-number equal to 1.95. The total track length of compound lens 700 is $T_{700}$=2.21 mm between surface 711 and an image plane 799. The ratio of total track length to effective focal length is $T_{700}/f_{700}$=8.19.

Lenses 710-740 have respective focal lengths $f_1$, $f_2$, $f_3$, and $f_4$, each which may be approximated by the lensmaker's equation using values of radii of curvature, axial thickness, and refractive index from Table 8. The computed focal lengths are $f_1=-0.58$ mm, $f_2=0.55$ mm, $f_3=-2.20$ mm, and $f_4=0.74$ mm, such that $R_1=-1.06$ and $R_2=1.56$. Wavelength dependence of refractive indices and effective focal length between $\lambda_d=587.6$ nm and $\lambda_0=850$ nm are sufficiently small such that the aforementioned focal length values and ratios apply at both $\lambda_d$ and $\lambda_0$.

Combinations of Features

Features described above as well as those claimed below may be combined in various ways without departing from the scope hereof. The following enumerated examples illustrate some possible, non-limiting combinations:

(A1) A compound lens includes four coaxially aligned lenses: (i) first lens and, in order of increasing distance therefrom, and on a same side thereof, (ii) a second lens, an inter-lens substrate, a third lens, and a fourth lens. The first lens and the third lens are negative lenses. The second lens and the fourth lens are positive lenses.

(A2) In embodiments of (A1), the second lens has a planar image-side surface on a planar object-side surface of the inter-lens substrate. The third lens has a planar object-side surface on a planar image-side surface of the inter-lens substrate.

(A3) Either of embodiments (A1) or (A2) further includes an image-side substrate; the fourth lens has a planar object-side surface on a planar image-side surface of the image-side substrate.

(A4) Any of embodiments (A1)-(A3) further includes an object-side substrate; the first lens has a planar object-side surface on a planar image-side surface of the object-side substrate.

(A5) In any of embodiments (A1)-(A4), the first lens, second lens, third lens, and fourth lens collectively have an effective focal length $f_{eff}$ such that an image is formed at an image plane located a distance T from an object-side surface of the object-side substrate, and the ratio $T/f_{eff}$ satisfying $3<T/f_{eff}<13$.

(A6) In any of embodiments (A1)-(A5), the Abbe number of the first lens is at least 37, and the Abbe number of the fourth lens is at least 26.

(A7) In any of embodiments (A1)-(A6), the first lens, second lens, third lens, and fourth lens collectively have an effective focal length $f_{eff}$ such that an image is formed at an image plane.

(A8) In any of embodiments (A1)-(A7), the first lens and the third lens have respective focal lengths $f_1$ and $f_3$, and the ratio $(f_1+f_3)f_{eff}/(f_1 f_3)$ is greater than $-2.5$ and less than $-0.3$.

(A9) In any of embodiments (A1)-(A8), the second lens and the fourth lens have respective focal lengths $f_2$ and $f_4$, and the ratio $(f_2+f_4)f_{eff}/(f_2 f_4)$ is greater than 0.4 and less than 3.

(A10) In any of embodiments (A1)-(A9), an image-side surface of the first lens is concave at the optical axis of the four coaxially aligned lenses.

(A11) In any of embodiments (A1)-(A10), an object-side surface of the second lens and an image-side surface of the third lens are convex and concave, respectively, at the optical axis of the four coaxially aligned lenses.

(A12) In any of embodiments (A1)-(A11), an object-side surface of the fourth lens is convex at the optical axis of the four coaxially aligned lenses.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated, the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

We claim:

1. A compound lens comprising: four coaxially aligned lenses including (i) a first lens and, in order of increasing distance therefrom, and on a same side thereof, (ii) a second lens, an inter-lens substrate, a third lens, and a fourth lens;
the first lens and the third lens being negative lenses;
the second lens and the fourth lens being positive lenses, the fourth lens having a planar object-side surface facing the third lens.

2. The compound lens of claim 1, the second lens having a planar image-side surface on a planar object-side surface of the inter-lens substrate, the third lens having a planar object-side surface on a planar image-side surface of the inter-lens substrate.

3. The compound lens of claim 1, further comprising an image-side substrate, the planar object-side surface of the fourth lens being on a planar image-side surface of the image-side substrate.

4. The compound lens of claim 1, further comprising an object-side substrate, the first lens having a planar object-side surface on a planar image-side surface of the object-side substrate.

5. The compound lens of claim 4, the first lens, second lens, third lens, and fourth lens collectively having an effective focal length $f_{eff}$ such that an image is formed at an image plane located a distance T from an object-side surface of the object-side substrate, and the ratio $T/f_{eff}$ satisfying $3<T/f_{eff}<13$.

6. The compound lens of claim 1, wherein the Abbe number of the first lens is at least 37, and the Abbe number of the fourth lens is at least 26.

7. The compound lens of claim 1, the first lens, second lens, third lens, and fourth lens collectively having an effective focal length $f_{eff}$ such that an image is formed at an image plane.

8. The compound lens of claim 7, the first lens and the third lens having respective focal lengths $f_1$ and $f_3$, the ratio $(f_1+f_3)f_{eff}/(f_1 f_3)$ being greater than $-2.5$ and less than $-0.3$.

9. The compound lens of claim 7, the second lens and the fourth lens having respective focal lengths $f_2$ and $f_4$, the ratio $(f_2+f_4)f_{eff}/(f_2 f_4)$ being greater than 0.4 and less than 3.

10. The compound lens of claim 1, an image-side surface of the first lens being concave at the optical axis of the four coaxially aligned lenses.

11. The compound lens of claim 1, an object-side surface of the second lens and an image-side surface of the third lens being convex and concave, respectively, at the optical axis of the four coaxially aligned lenses.

12. The compound lens of claim 1, an object-side surface of the fourth lens being convex at the optical axis of the four coaxially aligned lenses.

* * * * *